June 24, 1969

A. J. BUNDY ETAL 3,451,542

GLASS CASE

Filed Dec. 1, 1966

INVENTORS
ALBERT J. BUNDY
JAMES L. WILLIAMS
BY

ATTORNEYS

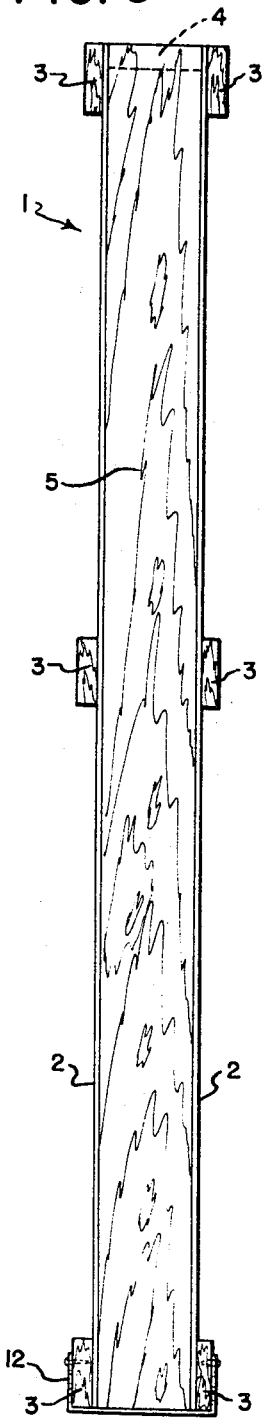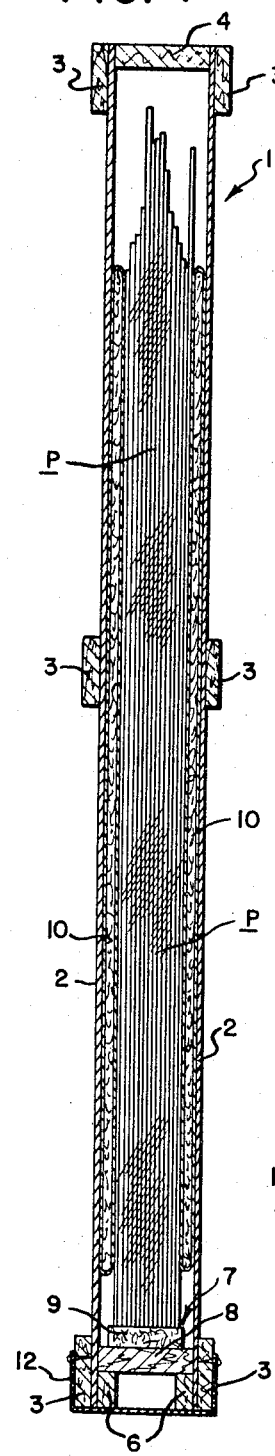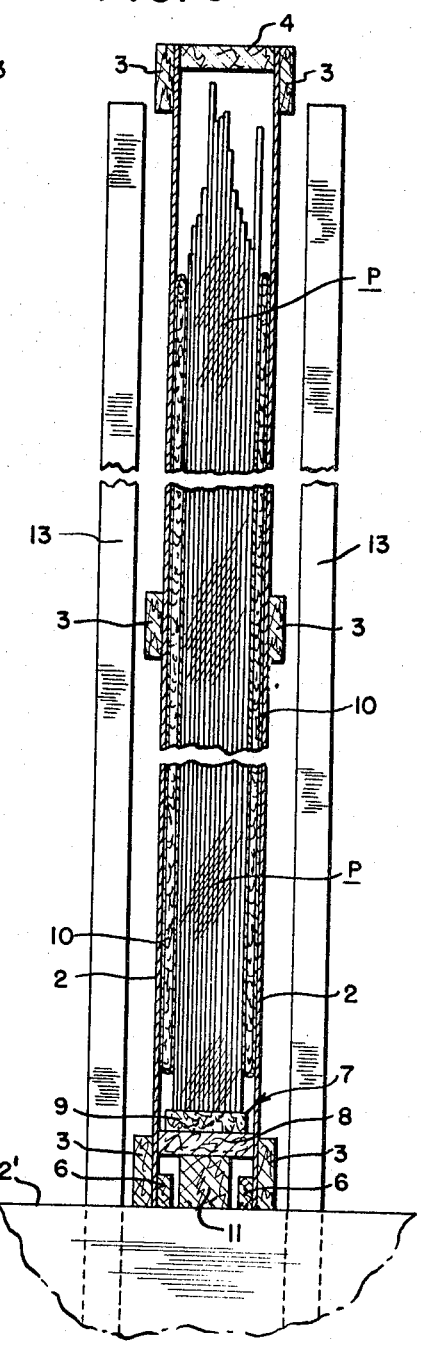

United States Patent Office 3,451,542
Patented June 24, 1969

3,451,542
GLASS CASE
Albert J. Bundy and James L. Williams, Kingsport, Tenn., assignors to American Saint Gobain Corporation, Kingsport, Tenn., a corporation of Delaware
Filed Dec. 1, 1966, Ser. No. 598,335
Int. Cl. B65d 83/00, 85/46, 85/48
U.S. Cl. 206—56                                6 Claims

ABSTRACT OF THE DISCLOSURE

A glass case having a pair of side walls, end members and a top member providing a storage area for receiving glass sheets, fixed spaced support means disposed along the bottom of the case, and movable support means seated on the fixed support means for supporting the glass sheets.

---

This invention relates to glass packaging and more particularly to a glass case constructed to hold sheets of glass in a protected fashion during shipping and storage and permit removal of individual sheets or the entire pack in an efficient manner minimizing the chances of breakage.

Conventionally, glass sheets are packaged for shipping and storing in wooden containers constructed to completely encase the glass. Such containers or cases are typically comprised of wooden boards or slats nailed to each other to form a box-like construction and the glass sheets are adapted to be supported therein with one edge resting on the bottom portion of the case which is, in turn, secured to the side members by the above-mentioned nailing. Since the actual support member for the glass sheets forms a fixed part of the case, removal of the individual sheets or the entire pack from the case requires that enough of the case, and at least one complete side, be disassembled and removed so that unobstructed access to the glass is provided. It is then possible to remove the sheets individually off the support and from the remaining part of the case. It is, however, necessary that extreme care be taken in removing these individual sheets since they are still partially encompassed by the remaining parts of the case and any accidental striking against these parts can easily cause breakage. Alternatively, in some situations, the entire case structure is broken apart to expose the glass sheets. This, however, necessitates considerable handling of the case while in close proximity to the enclosed glass and thus further increases the chances of breakage of the glass.

In addition to removing individual sheets from the case, it is sometimes desirable to remove the entire pack as a unit and position it in another supporting structure which may be provided at the site of use of the glass and designed to more completely expose the sheets for subsequent handling. Removal of the entire pack as a unit from the case opened partially as described above is, however, difficult to effect since it requires a lifting of the entire pack off the glass supporting members of the case and this, in turn, necessitates direct grasping of the pack. Where, as is often the situation, these sheets are of any considerable size and weight, such handling of the entire pack requires extreme care and laborious procedures so as to avoid breakage.

In accordance with the teachings of the present invention, a glass case constructed, for example of wooden slats, is provided with a floating support member for holding the pack of glass sheets independently of the remaining case structure. The floating support member is slidably arranged within the bottom of the case and held from falling out of the bottom by fixed support members attached to the side walls of the case. To free the glass pack from the case, preparatory to its removal therefrom, the fixed support members are constructed to extend only partially across the space between the side walls of the case. This provides an opening for receiving suitable lifting means adapted to lift the floating support member to a position spaced above and free of the fixed side support members. To effect this raising of the floating support member, the lifting members are constructed with a height which is greater than the height of the fixed side support members as measured from the bottom of the case. Accordingly, when the case with the lifting means associated therewith as described above is placed with its bottom on a suitable supporting surface, the floating support member and pack of glass held thereby will become freed from the remaining case structure; and after simply removing one end of the case by cutting or pulling of the attaching nails, the remaining part of the case may be readily removed, either partially or completely, from the pack of glass with a simple sliding movement to expose the glass for subsequent handling.

A more complete understanding of the present invention will be obtained from a reading of the following detailed description thereof with reference being made to the accompanying drawings of which:

FIG. 3 is an end view of the case;

FIG. 4 is a section taken along the line 4—4 of FIG. 1;

FIG. 5 is a section similar to FIG. 4 showing a modified embodiment of the glass case located on a suitable support preparatory to removal of the glass from the case.

Figure 1:
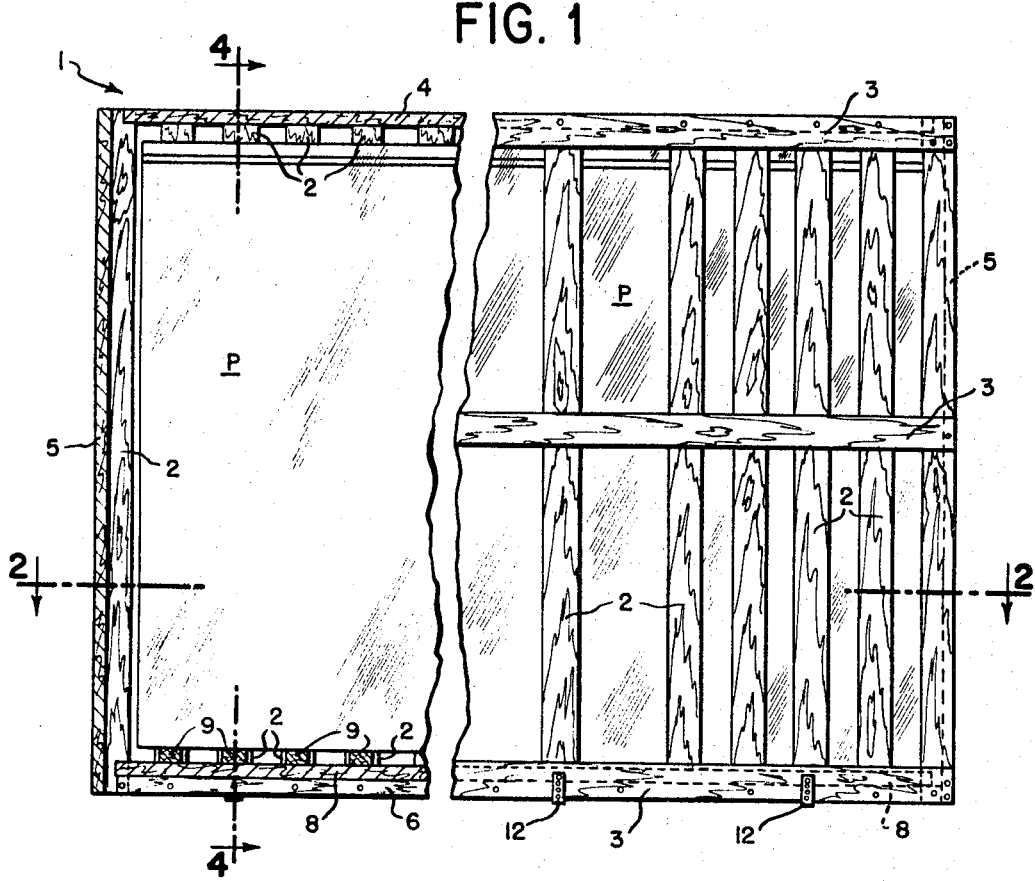
FIG. 1 is a front elevation of the glass case of the present invention with parts broken away.
Figure 2:
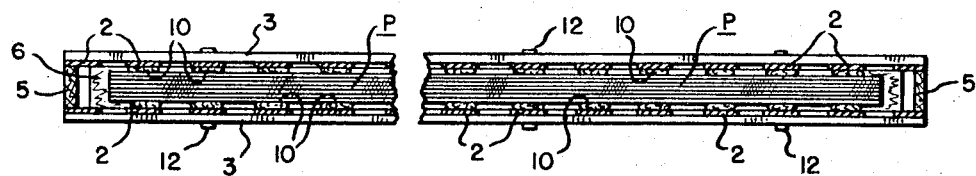
FIG. 2 is a section taken along the line 2—2 of FIG. 1.
Figure 6:
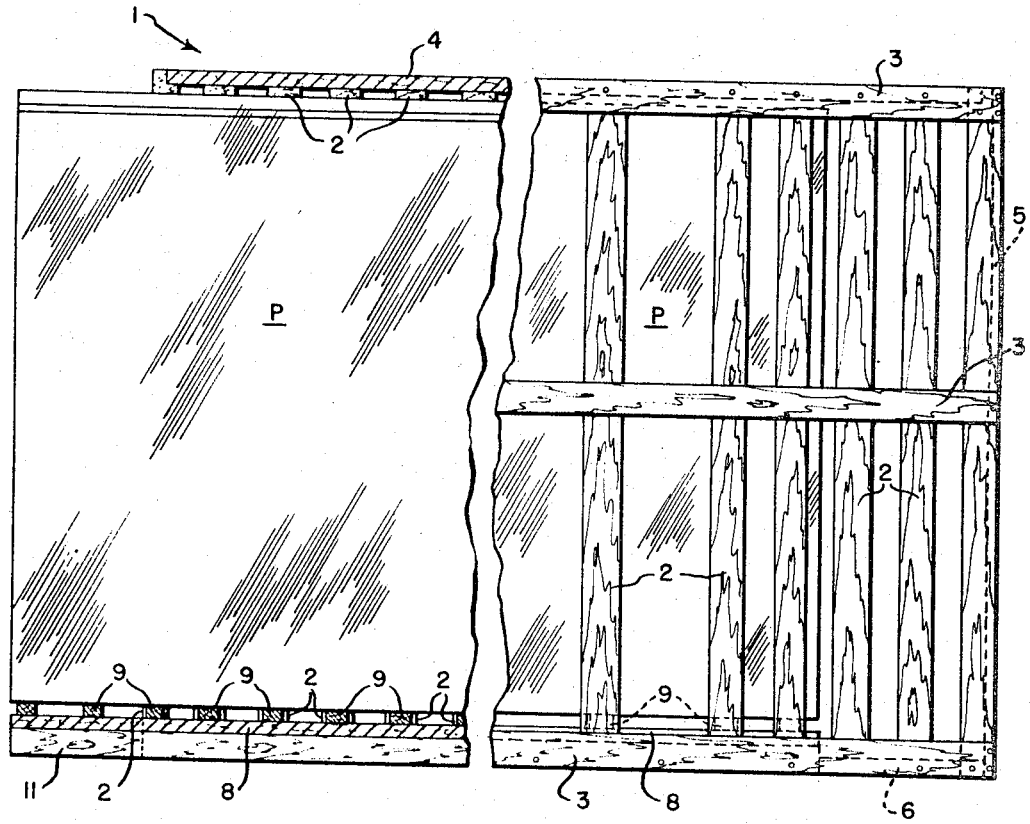
FIG. 6 is a front elevation showing the case partially removed.

As shown in the drawings, the glass case of the present invention generally designated at 1 includes side wall members 2 and 3, a top member 4 and end members 5. All of these members are secured together, as by nailing, with the side wall members in spaced relationship to define a storage area for a pack P of glass sheets.

For supporting the pack of glass within the case, the side wall members are provided with fixed support means comprised of rail members 6. These rail members are secured to the bottom of the side walls along their inner surfaces and extend from one end of the case to the other. As shown in FIG. 4, the rail members 6 extend partially across the space between the side wall members to define a bottom opening in the case.

Disposed above the rail members 6 is a support means 7 for holding the pack of glass. This support means includes a bottom elongated board member 8 spanning the opening between the rail members 6 and extending the length of the case and a plurality of spaced insulboard, shock absorbing blocks 9 fixed to the upper surface of the board member 8. As shown in the drawings, the vertical side wall members 2 are provided with suitable cushioning means 10 attached to their inner surfaces for snugly retaining the glass between the side wall members. Also, to add rigidity to the case, the horizontal wall members 3 are secured to the vertical wall members 2 at the top, middle and bottom of the case with the bottom horizontal members 3 also functioning as rail members similar to the rail members 6 to provide a stable support for the case.

In accordance with the teachings of the present invention, the support means 7 is constructed as a free member positioned within the case for sliding vertical movement from a first position resting on the rails 6 to a second position spaced above the rails. In addition, the support means 7 is adapted to be moved relative to the remaining case structure in a direction along its length to permit removal of the glass pack through one end of the case as more fully described below.

In the embodiment of the invention shown in FIG. 5, lifter means 11 are secured to the bottom surface of the board member 8 in alignment with the opening in the bottom of the case. Preferably, the lifter means comprises a plurality of blocks, one of which is shown in FIG. 5, spaced along the insulboard. As shown in FIG. 5, where the case is depicted as located on a horizontal support 12′ preparatory to removal of the glass therefrom, the height of the upper supporting surfaces of the rails 6 as measured from the bottom of the case is less than the height of the lifter means.

In this embodiment of the present invention, the case is completed by U-shaped metal strap members 12, such as shown in FIGS. 1 and 4, secured at spaced intervals along the bottom of the case for holding the bottom against spreading during handling of the case. Preferably, the strap members are positioned intermediate the lifter blocks 11 so that during handling of the case, and in particular, lifting thereof, the insulboard will rest on the rails 6 which will, in turn, provide the necessary support for the pack of glass.

When the case is located on the horizontal support 12′ as shown in FIG. 5, the support means 7 for the pack of glass will be moved to a raised position above the rails 6 as contact is made between the support 12′ and the lifter block 11. To separate the pack of glass from the case, one of the end members 5 and the straps 12 are first removed and the remaining case structure is then simply slid in a lateral direction with the pack of glass passing through the open end of the case. During this sliding of the case, the rails 6 and the bottom side wall members 3 act as stabilizing runners keeping the case properly aligned with the pack of glass. Vertical support members 13 are provided on the horizontal support 12′; and as the glass becomes exposed through the open end of the case, suitable cushioning means (not shown) are placed therebetween for engaging the opposite sides of the pack of glass to properly support it in its vertical orientation. The case may then be completely removed from the glass to leave it standing between the vertical support members 13.

In the embodiment of the invention shown in FIG. 4, the lifter means are dispensed with; and instead, the horizontal support 12′ upon which the case is located preparatory to removal of the glass will be provided with its own lifter means. The height of such lifter means relative to the height of the rails 6 of the case will be the same as in the embodiment of the invention shown in FIG. 5 and the case will be supported on the horizontal support with the lifter means disposed in the opening in the bottom of the case so as to raise the pack of glass above the rails 6. With this construction, the removal of the case from the pack of glass, once the case is located on the horizontal support 12, is accomplished in the same manner as described above with reference to the embodiment of the invention shown in FIG. 5.

The above description of the present invention has been given with reference to the presently preferred embodiments; however, it is to be understood that various changes may be made thereto without departing from the scope of the invention as set forth in the following claims.

We claim:
1. In a glass case having a pair of side walls connected together in spaced relationship at the top and ends thereof by a top member and end members with at least one of said members being removable and with the space between said side walls defining a storage area for receiving glass sheets, the improvement comprising:
    (a) a first support means connected to each of said side walls at the bottom thereof and projecting partially across the space therebetween to define a bottom opening extending between said end members; and
    (b) a second support means slidably disposed between said side walls adjacent the bottom thereof and above said first support means, said second support means spanning said opening intermediate said first support means for supporting said glass sheets in said storage area and movable from a first position resting on said first support means to a second position spaced above said first support means in floating relation with respect to the remaining case structure.

2. In a glass case having a pair of side walls connected together in spaced relationship at the top and ends thereof by a top member and end members with at least one of said members being removable and with the space between said side walls defining a storage area for receiving glass sheets, the improvement comprising:
    (a) a first support means connected to each of said side walls at the bottom thereof and projecting partially across the space therebetween to define a bottom opening extending between said end members; and
    (b) a second support means slidably disposed between said side walls adjacent the bottom thereof and above said first support means, said second support means spanning said opening intermediate said first support means for supporting said glass sheets in said storage area and movable from a first position resting on said first support means to a second position spaced above said first support means, said support means being slidably positioned between said side walls for movement in a lateral direction relative to the remaining case structure when one of said end members is removed.

3. In a glass case according to claim 2 wherein said second support means comprises:
    (a) an elongated member extending between said end members; and
    (b) a plurality of shock absorbing members secured to the upper surface of said elongated member for supporting one edge of said glass sheets.

4. In a glass case according to claim 3 wherein:
    (a) said first support means has an upper supporting surface spaced a predetermined height above the bottom of said side walls; and
    (b) said second support means include lifter means attached to the bottom thereof and extending through said opening, said lifter means having a height greater than said predetermined height.

5. In a glass case according to claim 4 wherein:
    (a) said first support means comprises a pair of inner rails attached to said side walls and extending between said end members.

6. In a glass case according to claim 5 wherein said case further includes:
    (a) outer rail members attached to the outer surfaces of said side walls at the bottom thereof; and
    (b) U-shaped strap members removably secured at spaced intervals across the bottom of said case.

References Cited
UNITED STATES PATENTS

| | | | |
|---|---|---|---|
| 1,670,343 | 5/1928 | Clemens | 150—39 |
| 904,694 | 11/1908 | Hemmick | 217—36 |
| 3,185,298 | 5/1965 | Verspecht | 206—62 |
| 1,646,902 | 10/1927 | Diebold | 217—64 |

FOREIGN PATENTS

| | | |
|---|---|---|
| 241,328 | 7/1946 | Switzerland. |
| 651,413 | 10/1928 | France. |
| 1,385,368 | 12/1964 | France. |

JOSEPH R. LECLAIR, *Primary Examiner.*

JOHN M. CASKIE, *Assistant Examiner.*

U.S. Cl. X.R.

206—62